US006598539B2

(12) United States Patent
Oakley

(10) Patent No.: US 6,598,539 B2
(45) Date of Patent: Jul. 29, 2003

(54) POWER DOOR OPERATOR HAVING A DRIVE MEMBER FUNCTION AS A HANGER PORTION AND ROLLERS OF A DOOR PANEL HANGER ENGAGING THE DRIVE MEMBER FOR MOTION THEREALONG

(75) Inventor: Robert L. Oakley, Chicago, IL (US)

(73) Assignee: Westinghouse Air Brake Technologies Corporation, Wilmering, PA (US)

( * ) Notice: Subject to any disclaimer, the term of this patent is extended or adjusted under 35 U.S.C. 154(b) by 0 days.

(21) Appl. No.: 09/990,999

(22) Filed: Nov. 14, 2001

(65) Prior Publication Data

US 2003/0089269 A1 May 15, 2003

(51) Int. Cl.$^7$ .................................................. B60N 5/00
(52) U.S. Cl. ..................................... 105/343; 105/329.1
(58) Field of Search .............................. 105/329.1, 332, 105/339, 341, 343; 104/27, 28

(56) References Cited

U.S. PATENT DOCUMENTS 4,915,032 A * 4/1990 Drews ..................... 105/329.1
5,460,100 A * 10/1995 Gowda et al. .............. 105/341
6,125,768 A * 10/2000 Kurnik ........................ 105/343
6,401,629 B1 * 6/2002 Brunooghe .............. 105/329.1

* cited by examiner

*Primary Examiner*—S. Joseph Morano
*Assistant Examiner*—Robert J. McCarry, Jr.
(74) *Attorney, Agent, or Firm*—James Ray & Associates

(57) ABSTRACT

A powered operator assembly for moving an object along a linear axis and particularly for moving doors in a mass transit vehicle utilizing a helical drive member for moving and supporting an attached door panel. The helical drive engages a drive nut that is connected to one of the two door panel hanger assemblies. Each door panel hanger assembly is attached to the door panel and includes at least two rollers which engage the outer surface of a helical drive for motion along the drive axis. One end of such helical drive is connected to an electric prime mover with such prime mover mounted to a stationary bracket mounted to the door opening structure. The second end of the helical drive engages a bearing mounted to a stationary bracket mounted to the door opening structure.

8 Claims, 5 Drawing Sheets

POWER DOOR OPERATOR HAVING A DRIVE MEMBER FUNCTION AS A HANGER PORTION AND ROLLERS OF A DOOR PANEL HANGER ENGAGING THE DRIVE MEMBER FOR MOTION THEREALONG

FIELD OF THE INVENTION

The present invention relates, in general, to powered linear drive type mechanisms for moving an attached object and, more particularly, the present invention relates to a linear drive mechanism for moving a door panel on a rail transit vehicle and, still more particularly, this invention relates to a door operator mounted overhead of a door panel and incorporating a helical drive for moving and supporting such door panel.

BACKGROUND OF THE INVENTION

Powered overhead door operator assemblies in use prior to the conception and development of the present invention generally employ separate members for moving and supporting the door panel. U.S. Pat. No. 6,422,970 discloses such an overhead operator and U.S. Pat. No. 6,040,697 discloses a self aligning drive nut bracket for use in these assemblies. The teachings in each of the above referenced patents is incorporated herein by reference thereto.

In these arrangements the door drive includes a base plate mounted overhead of a door opening. The base plate includes a separate hanger cavity for housing rollers that are attached to door panel hangers. Such hanger cavity extends along the full length of the base plate. The door drive is located above or to the side of the roller cavity. The drive nut is usually connected to the door panel or door panel hanger via an elaborate linkage to minimize the substantial force generated by offsetting the door drive and door hanger cavity. In addition, the physical displacement between the drive member and door hanger results in additional adjustments of the door panel with regards to motion transverse to the panel plane and hanger cavity axis. Further, the offset arrangement of the door drive and hanger cavity requires larger door operator envelope within the door opening structure.

SUMMARY OF THE INVENTION

The present invention provides an overhead linear power door operator for moving at least one door panel of a mass transit vehicle. Such door operator comprising a first operator support mountable overhead of a door opening in the transit vehicle. A drive member is connected to the support at a distal end thereof. An electric rotary prime mover is connected to such drive member using a coupler to power the drive member. Such prime mover is further connected to a second operator support mountable overhead of the door opening in such transit vehicle. A drive nut having an internal threaded bore engages such helical drive member to be driven by this helical drive member upon rotation of such helical drive member by the electric rotary prime mover. There is a driving door panel hanger bracket which extends above such door panel. The door panel bracket is connected to the drive nut. The door panel bracket having at least two upper rollers and at least one lower roller engaging such drive member for motion therealong. A driven door panel hanger bracket extends above such door panel. Such door panel bracket having at least two upper rollers and at least one lower roller engaging such drive member for motion therealong.

OBJECTS OF THE INVENTION

Therefore, it is one of the primary objects of the present invention to provide an overhead powered door drive having a single hanger and drive member for substantially minimizing door drive/door panel offsets and wear producing forces.

It is an additional object of the present invention to provide a powered door operator having a drive member of a sufficient rigidity to support the weight of the attached door panel.

It is a further object of the present invention to provide a powered door operator wherein the location of the convex rollers to the drive nut provides a simplified linkage arrangement between the drive nut and door panel.

It is another object of the present invention to provide a powered door operator wherein the location of the convex upper rollers to the helical drive axis provides stability for the door panel.

It is still another object of the present invention to provide a lighter weight powered door operator having fewer parts.

It is yet another object of the present invention to provide a powered door operator utilizing a smaller envelope within the door opening structure.

These and various other objects and advantages to the present invention will become more apparent to those persons skilled in the art from the following more detailed description, particularly, when such description is taken in conjunction with the attached drawings and the appended claims.

DESCRIPTION OF VARIOUS EMBODIMENTS OF THE INVENTION

Figure 1:
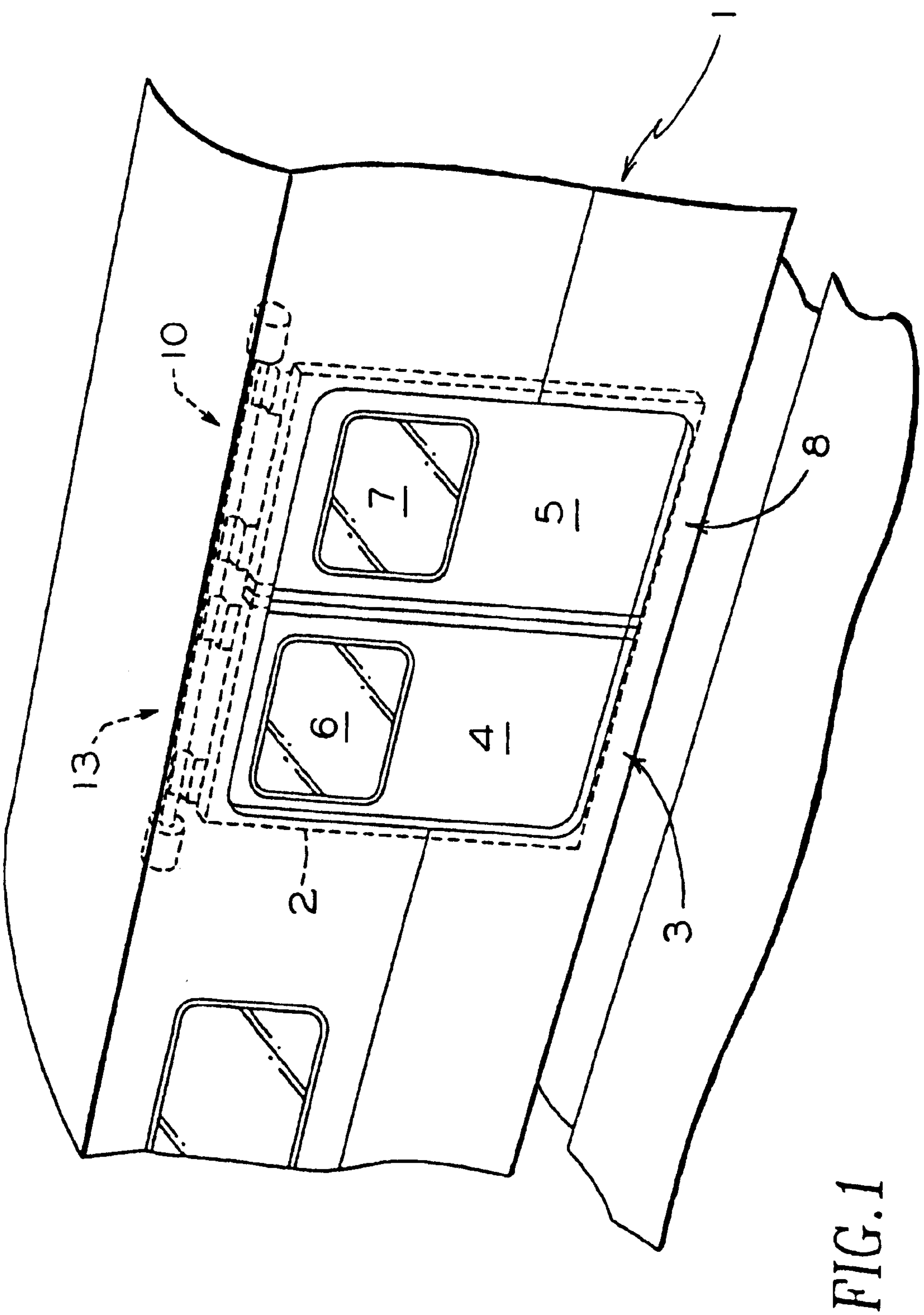
FIG. 1 is a partial perspective view of a typical transit car body, particularly showing the location of the door operators of the invention in place overhead of reciprocating car door panels.

Prior to proceeding to the more detailed description of the present invention, it should be noted that for the sake of clarity identical components, having identical functions have been identified with identical reference numerals throughout the several views which have been illustrated in the drawing figures.

The invention disclosed herein largely overcomes the above discussed difficulties through the additional use of the outer surface of a helical drive as a hanger portion. This arrangement minimizes the force that is generated by the drive member being offset. In addition, the door panel hangers utilize at least two upper rollers operating on the outer surface of the helical drive. This arrangement greatly reduces the criticality of the transverse door panel adjustment.

Also, a part of the invention disclosed herein satisfies a long felt need by providing a greatly simplified mounting arrangement incorporating two stationary door panel hanger brackets at each end of the helical drive. This allows reduction in the overall weight of the door operator. The design, therefore, provides the advantage of reduced manufacturing costs.

With respect to FIG. 1, there is shown a partial view of a "typical" transit vehicle, generally designated 1, having a door opening 2. Vehicle 1 has a power door, generally designated 3, consisting of door panel 4 driven by door operator, generally designated 13. Door panel 4 has a window 6. It also has a power door, generally designated 8, consisting of door panel 5 driven by a door operator, generally designated 10. Door panel 5 has a window 7. Bi-parting doors 4 and 5 are for reciprocal motion over and away from the opening 2 in such transit vehicle 1.

Mounted overhead of door panels 4 and 5, operators 10 and 13 provide the above-mentioned reciprocal motion. As such door operators 10 and 13 are identical, the following description will be concerned with operator 10 as those skilled in the art will readily understand that operation of operator assembly 13 is identical other than the direction of motion.

Figure 2A:
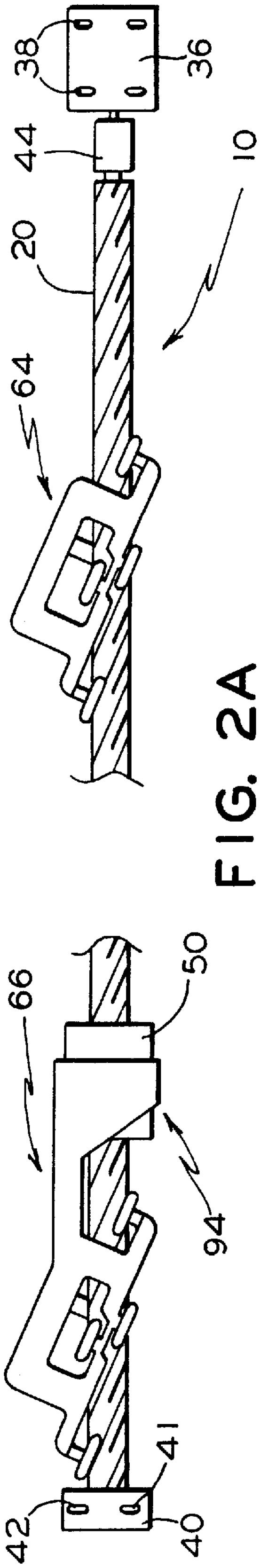
FIG. 2 is a perspective view of the operator shown in FIG. 1, particularly showing the location of the door panel and other operative components.
Figure 2B:
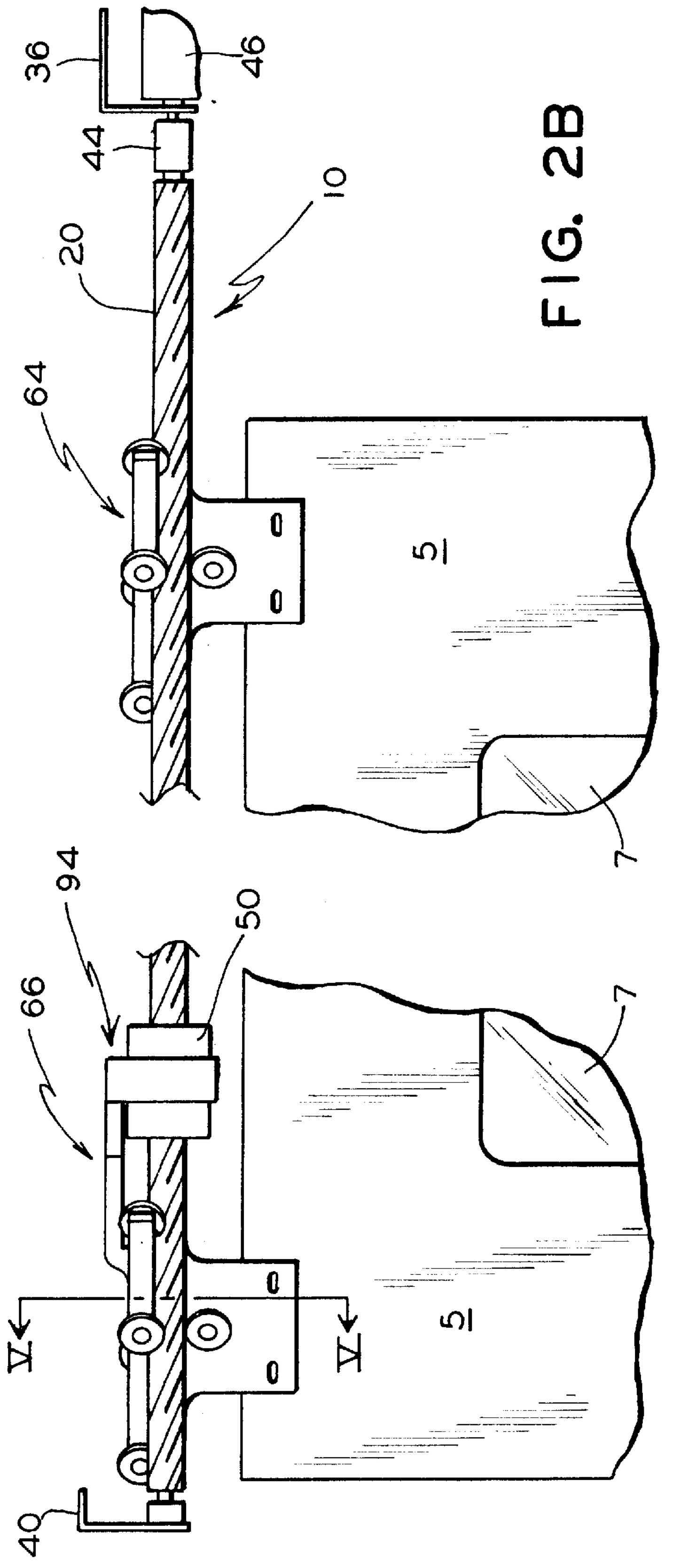

In the presently preferred embodiment shown in FIG. 2, drive member 20 is a helical drive member substantially rotatably mounted using drive motor 46, as a rotary electric prime mover, at one end. The drive motor 46 is coupled to helical drive member 20 via coupler 44. The prime mover 46 is connected to operator support 36 having cavities 38 for mounting to the door opening structure. The distal end of helical drive member 20 is supported by outboard bearing (not shown) journaled internal of the cavity in support 40 having cavities 41 and 42 for mounting to the door opening structure. Such cavities 38, 41 and 42 provide adjustments during installation to place the helical drive member 20 substantially parallel to the drive direction of door panel 5. In the presently preferred embodiment, drive nut 50 is of the known threaded bore design mounted on the drive member 20 for reciprocal motion along such helical drive member 20 on rotation thereof. Alternatively, drive nut 50 can be of a well known reciprocating ball or rolling pin design.

As also shown in FIG. 2, door operator 10 includes driving door panel hanger assembly, generally designated 66, and driven door panel hanger assembly, generally designated 64. Driving door panel hanger assembly 66 is connected to the drive nut 50 with the fork portion 94. As door panel hanger assemblies 64 and 66 are identical except for fork portion 94, the following description will be concerned with door panel hanger assembly 66 as those skilled in the art will readily understand that operation of door panel hanger assembly 64 is identical other than attachment to the drive nut. In the presently preferred embodiment, such driving door panel hanger assembly 66 is connected to the drive nut 50 via fork portion 94. Alternatively, drive nut 50 may be connected directly to door panel 5 as taught in U.S. Pat. No. 6,026,697. Motion of the drive nut 50 moves the door panel 5 on rotation of the helical drive member 20.

Figure 3:
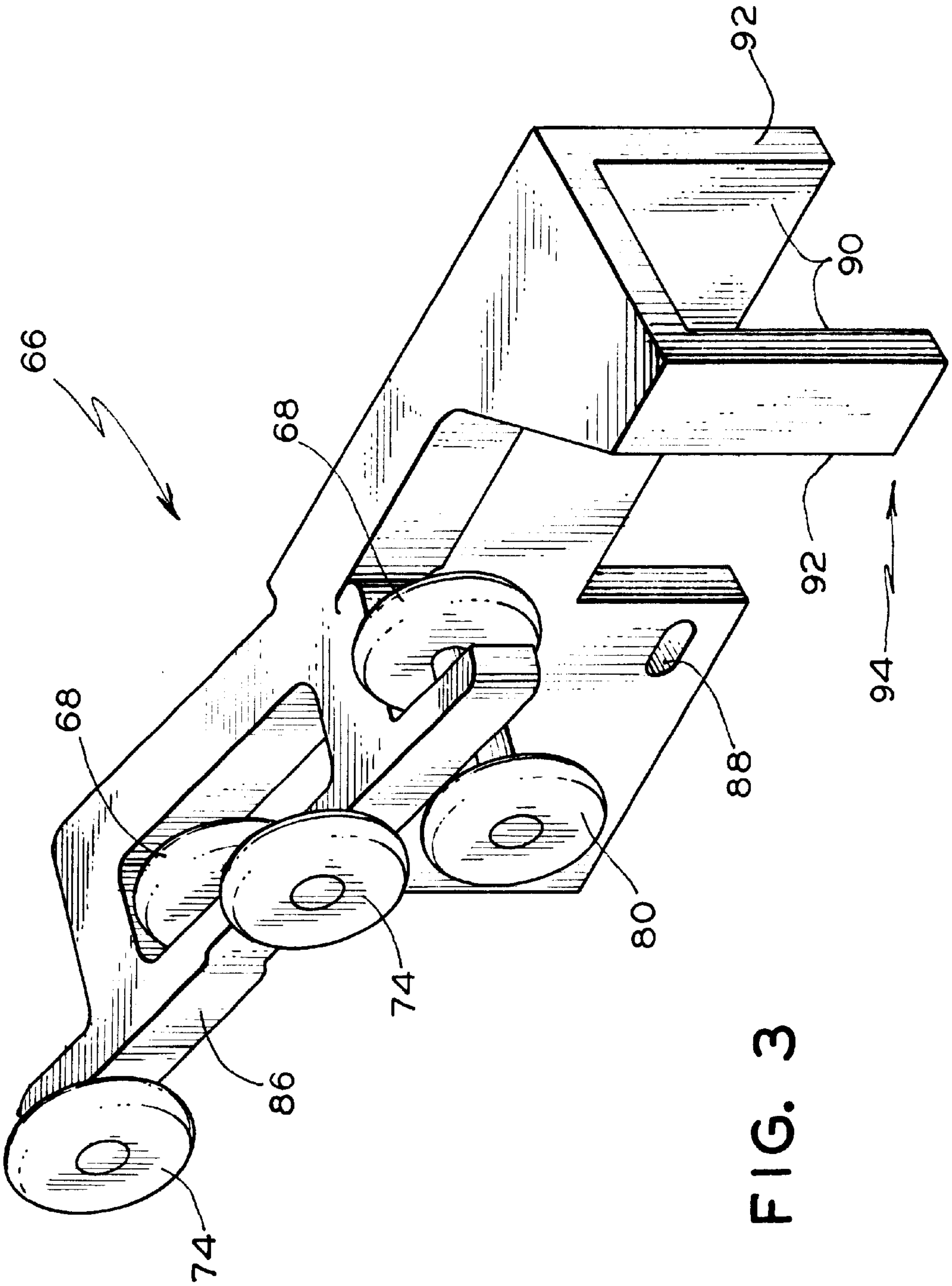
FIG. 3 is the partial view of the operator in FIG. 2, showing door panel hanger details.

As further shown in FIG. 3, the presently preferred door panel hanger assembly 66 includes at least one substantially vertical upper convex roller 68, at least one substantially vertical upper convex roller 74 and at least one substantially vertical lower convex roller 80. Each of the rollers 68, 74 and 80 are rotatably attached to roller carriage portion 86 of the door panel hanger assembly 66. Door panel hanger assembly 66 is attached to the door panel 5 using at least one cavity 88 which provides for longitudinal adjustments of the door panel 5 within the door opening 2. Upper convex rollers 68 and 74, preferably of a low friction type, carry the weight of the door panel 5, while the low friction type lower convex roller 80 restricts lifting of the door panel 5 during movement. Alternatively, other types of a low friction design can be used in the place of convex lower roller 80 in the presently preferred embodiment.

Figure 4:
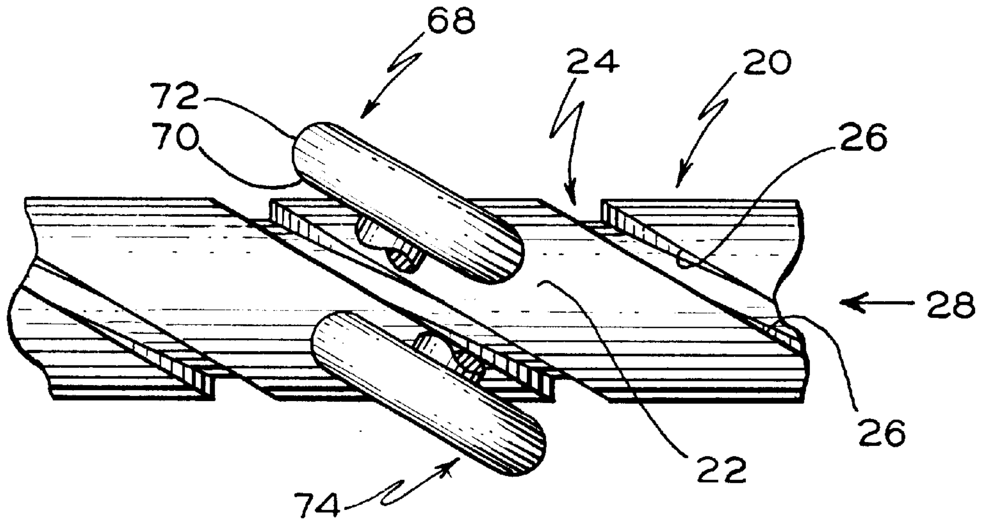
FIG. 4 is the partial view of the operator in FIG. 2 showing helical drive thread detail and roller orientation.

In further reference to FIG. 4 helical drive 20 contains internal thread 24 and a substantially smooth cylindrical outer surface portion 22 which creates an interface with thread 24 along thread line 26. It is presently preferred that thread lines 26 are substantially parallel to each other in an axial direction 28 of the helical drive 20. It is further preferred in the present embodiment that convex roller surface 70 is substantially parallel to the thread line 26 to accommodate engagement of the roller surface 72 along such outer surface portion 22 of helical drive 20 during rotation of the helical drive 22.

Figure 5:
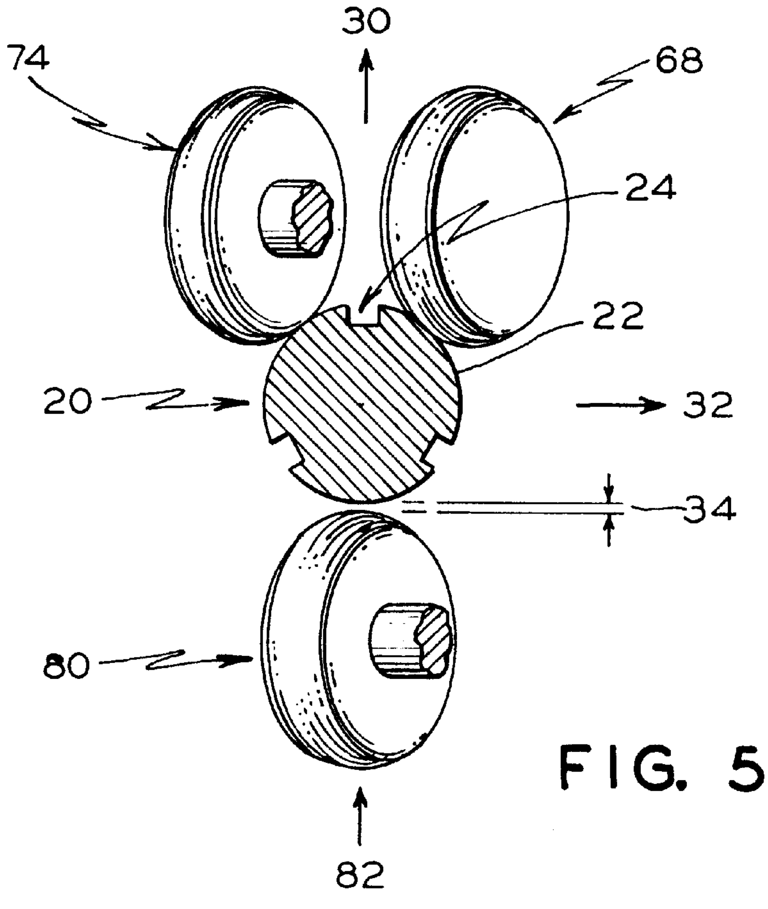
FIG. 5 is the cross-sectional view of the present invention taken along the lines 5—5 of FIG. 2 showing orientation of the upper and lower rollers on the helical drive.

Orientation of rollers 68 and 74 is further shown in FIG. 5 which is a cross-sectional view of the present invention along lines 5—5 in FIG. 2. It illustrates that upper rollers 68 and 74 are located substantially opposite to the vertical axis 30 of the helical drive 20 thus providing needed stability for the door panel hanger assembly 66. Furthermore, it is presently preferred that upper convex rollers 68 and 74 are located between about 30 and 60 degrees and more preferably located at about 45 degrees relative to the vertical axis 30 during the movement of the door panel 5. Such location prevents rotation of such rollers relative to the vertical axis 30 and substantially minimizes wear of the roller surface 72.

In further reference to FIG. 5 in the preferred embodiment lower convex roller 80 is located about the helical drive 20 with vertical axis 82 of such roller substantially linear with vertical axis 30 of helical drive 20. It is further presently preferred that an offset 34 exists between such roller 80 and the helical drive 20 during door panel movement to minimize friction.

Figure 6:
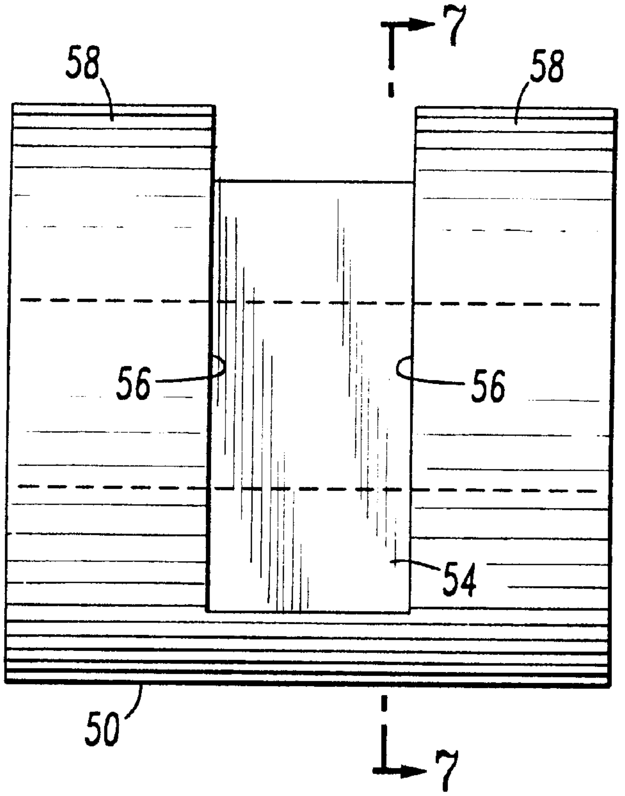
FIG. 6 is the plan view of the drive nut according to a presently preferred embodiment of the invention.
Figure 7:
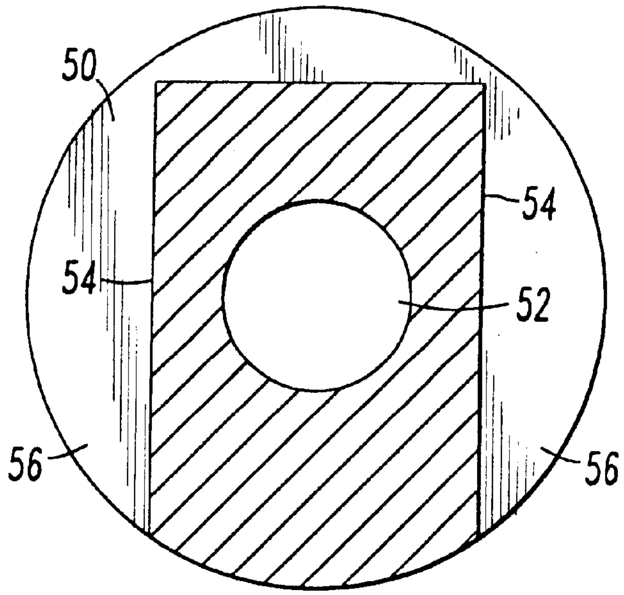
FIG. 7 is a cross-sectional view of the drive nut along lines 7—7 in FIG. 6.

Details of the presently preferred drive nut 50 are shown in FIG. 6 and FIG. 7 which is the section taken along lines 7—7 of FIG. 6. As taught in U.S. Pat. No. 6,026,697 these figures illustrate drive force applying surface portions 56 of drive nut 50 and torsion surfaces 54. Drive force applying surface portions 56 of nut 50 are engaged with such drive force receiving surface portions 92 of the fork portion 94 of the door panel driving hanger assembly 66. Torsion surfaces 54 of drive nut 50 are engaged with slide surface portions 90 of the fork portion 94. Drive nut 50 has a threaded bore 52 for engagement with drive screw 20 which has an internal helical thread 24. Additionally, the teachings of such U.S. Pat. No. 6,026,697 are incorporated into this application by reference thereto.

The door operator described herein includes operator supports mounted overhead of the door opening in the vehicle structure. Mounted internal of the supports is a helical drive including a drive nut having a threaded bore for engagement with a threaded surface of helical drive. The drive nut has at least one torsion surface portion for receiving a rotational constraint on the drive nut. Such drive nut further includes a drive force applying surface portion. The helical drive member is rotated by a rotary electric prime mover mounted to one of the supports. The opposite end of the helical drive is journaled internal of the other support. Both supports include mounting cavities allowing alignment of the drive screw substantially parallel to the drive direction.

It can be seen from the above description that the present invention provides two door panel hanger brackets which are attached to the upper end of the door panel. The driving door panel hanger bracket is connected to the above mentioned drive nut via a fork portion that engages at least two surfaces of the drive nut. The interface between such fork portion and drive nut provides the needed degree of freedom during the motion in order to compensate for manufacturing tolerances. Each door panel hanger assembly includes at least one set of substantially vertically oriented cylindrically convex rollers. The aforementioned substantially vertical orientation provides upper and lower rollers in each set. In operation, the upper and lower rollers cooperate with the outer surface of the helical drive, thereby providing low friction contamination resistant movement of the door panel when the rotary prime mover is energized and rotates the helical drive member. This configuration provides reciprocal travel of the drive nut and the attached door panel on the outer surface of the helical drive. Orientation of the upper rollers in relationship to the longitudinal axis of the helical drive provides door panel hanger stability during helical drive rotation and limits the forces exerted by the door panel hanger on such helical drive.

Locking of the door panel in a closed condition can be accomplished by a variety of means. The application of "solenoid" type locks or "overcenter" type locks well known in the field of the mass transit door equipment can be easily recognized by those persons skilled in the transit operator design art form. The application of the various annunciation devices used to provide status of the door states will also be apparent to those persons skilled in the transit operator design art form.

Although a presently preferred and various alternative embodiments of the drive member functioning as a door hanger support has been described in considerable detail above, with particular reference to the drawing FIGURES, it should be understood that various additional modifications and/or adaptations of the present invention can be made and/or envisioned by those persons skilled in the relevant art without departing from either the spirit of the instant invention or the scope of the appended claims.

I claim:

1. An overhead linear power door operator for moving a door panel of a mass transit vehicle, said door operator comprising:

(a) a first operator support mountable overhead of a door opening in said transit vehicle;

(b) a drive member connected to said first operator support at a first end thereof;

(c) an electric rotary prime mover connected to said drive member through a coupler for powering said drive member, said prime mover connected to a second operator support mountable overhead of said door opening in said transit vehicle;

(d) a drive nut having an internal threaded bore, said drive nut engaging said drive member to be driven by said drive member upon rotation of said drive member by said electric rotary prime mover;

(e) a driving door panel hanger bracket extending above said door panel and connected to said drive nut, said door panel hanger bracket having at least two upper rollers and at least one lower roller engaging said drive member for motion along said drive member; and (f) a driven door panel hanger bracket extending above said door panel, said door panel bracket having at least two upper rollers and at least one lower roller engaging said drive member for motion along said drive member.

2. A power door operator, according to claim 1, wherein said drive member is a helical drive.

3. A power door operator, according to claim 2, wherein said helical drive is at least sufficiently rigid to support the weight of said door panel.

4. A power door operator, according to claim 2, wherein said helical drive member includes substantially smooth outer surface portions.

5. A power door operator, according to claim 4, wherein said at least two upper rollers is four upper rollers engaging said substantially smooth outer surface portion of said helical drive.

6. A power door operator, according to claim 1, wherein said rollers include a convex portion.

7. A power door operator, according to claim 6, wherein said convex rollers are substantially parallel with a helix angle of said drive member.

8. A power door operator, according to claim 6, wherein two pair said upper rollers are substantially opposite to each other and said rollers are generally located 45 degrees from a vertical axis of said helical drive.

* * * * *